United States Patent [19]

Hankosky et al.

[11] 4,074,542

[45] Feb. 21, 1978

[54] COUPLING

[75] Inventors: Andrew Hankosky, Pittsburgh; E. Frederick Schoeneweis, Coraopolis, both of Pa.

[73] Assignee: Rockwell International Corporation, Pittsburgh, Pa.

[21] Appl. No.: 738,366

[22] Filed: Nov. 3, 1976

[51] Int. Cl.² .............................................. F16D 3/06
[52] U.S. Cl. .................................. 64/30 R; 64/15 B; 64/DIG. 2; 192/56 R
[58] Field of Search ............... 64/2 R, 13, 15 B, 15 R, 64/23, 30 R, 30 D, DIG. 2; 192/56 R; 267/135

[56] References Cited
U.S. PATENT DOCUMENTS

| 3,012,456 | 12/1961 | Dracka | 192/56 R X |
| 3,287,935 | 11/1966 | Grunbaum | 64/30 R |
| 3,646,777 | 3/1972 | Anderson et al. | 64/15 R |

*Primary Examiner*—Duane A. Reger

[57] ABSTRACT

A coupling for drivingly connecting two members operatively coupled at a lost motion connection including first and second sets of Belleville springs separated by a double tapered annular spacer wherein the apex rims of the outer springs engage the members and the base rim of the inner springs engage the outer periphery of the opposed surface of the spacer, the base surfaces of the inner springs fully engaging the spacer at a predetermined tensile load to prevent overdeflection of the springs and to directly couple the members together.

7 Claims, 2 Drawing Figures

COUPLING

BACKGROUND OF THE INVENTION

This invention relates to couplings and, in particular, a coupling between limited axially extendable and translatable members.

A valve actuator coupling is described in the copending application, Ser. No. 663,786 filed on Mar. 4, 1976 in the name of T. E. Kunkle, entitled VALVE-ACTUATOR COUPLING and assigned to the assignee of the present invention, wherein a valve actuator shaft is operatively connected to a valve stem by a coupling which limits valve backseat loading. The coupling includes first and second members, respectively joined to the stem and the actuator, and interconnected at a lost motion connection. The arrangement is such that compressive forces are directly transmitted between the members but, under increasing tensile loading, the members relatively separate and extend as spring means at the lost motion connection are increasingly deflected until the springs are fully deflected. Thereafter, concurrent movement and direct tensile force transmission is effected between the members. In order to prevent full deflection of the Belleville springs, the latter are disposed in series relationship within a counterbore in one member. Under high tensile loads, an annular stop collar engages a stop surface on the other member when the springs are less than fully deflected. In this manner full deflection of the Belleville springs is prevented.

While the aforementioned stop collar limits the deflection of the Belleville springs, certain limitations are present in such a design. For instance, the collar counterbore limits spring diameter for a given coupling diameter. This in turn increases the stress level within the springs for a given loading and deflection. High stresses then make it more imperative that the deflection of the spring be controlled to prevent overdeflection. Further, the annular stop collar is subject to manufacturing inaccuracies and, inasmuch as it directly determines the deflection of the springs, the ultimate load transmission of the coupling affected thereby. In other words, the deflection and load transmission are not solely a function of the spring deflection. Additionally, the mating apexes of the springs in the series design are not self-centering and, should axial or radial misalignment occur, the desired operative relationships are not maintained thereby affecting load transmission characteristics.

The present invention on the other hand, provides a coupling wherein larger sized Belleville springs are disposed in series to provide an extended deflection range with lower stresses limits. The springs have their inner base rims in engagement with a double tapered annular spacer having conical surfaces which directly limit the spring deflection and thereby the ultimate loading thereon. By using the intermediate spacer to directly achieve deflection limitation, the effect of extraneous tolerances are eliminated. Variable deflections can be established by merely substituting spacers with varying conical angles and the loading can be changed by increasing the number of springs providing the coupling has sufficient axial capabilities to accommodate the same without revision of other component parts. The spacer also provides a centering capability for the opposed spring sets to maintain the same in operative relationship in assembly.

To this end, the coupling comprises first and second members which are telescopically journalled for relative axial movement at an annular lost motion connection having axially spaced surfaces. First and second sets of Belleville springs are disposed in the lost motion connection in opposed relation. The springs are separated by the double tapered annular spacer. The arrangement is such that the apex annular surfaces of the inner springs engage spacer while the base rims of the outer springs are initially engageable at low loads with an outer portion of the spacer and increasingly deflect toward the spacer as the tensile loading increases until full engagement is achieved when the springs reach a predetermined deflection and consequently an upper tensile load transmission limit, after which deflection, the members are directly coupled.

The above and other features of the present invention will be readily apparent to those skilled in the art by reading the following detailed description, reference being made to the accompanying drawings illustrating the preferred embodiment in which.

Figure 1:
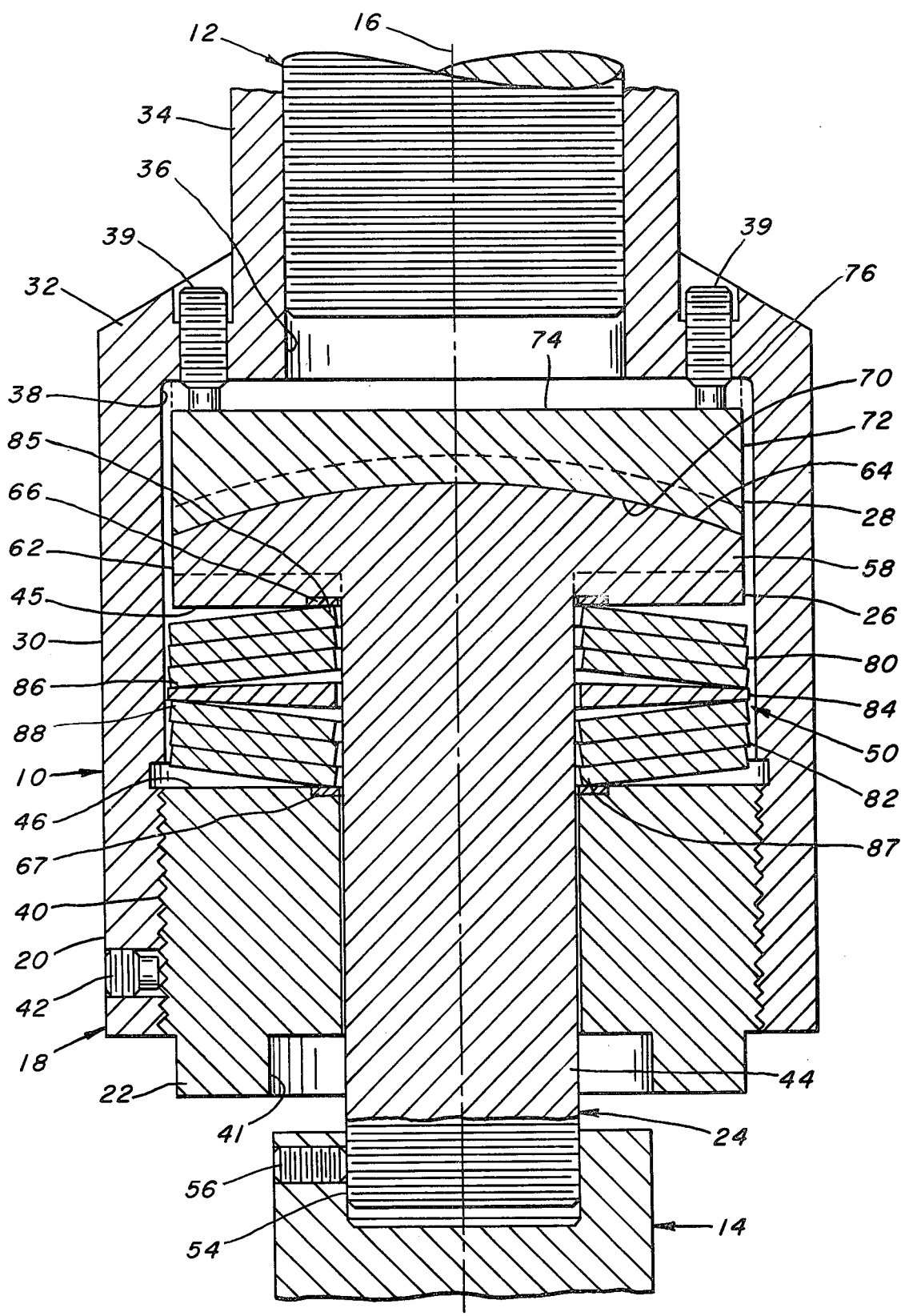
FIG. 1 is a cross-sectional view showing the coupling in the preloaded position with the unloaded position shown in dashed lines.

Referring to FIG. 1, there is shown a coupling 10 for operatively connecting a driving shaft 12 to a driven shaft 14 for translation along an axis 16. As disclosed in the aforementioned Ser. No. 663,786, the coupling 10 may be used to operatively interconnect a valve actuator with a valve disc in a manner which controls valve backseat loading. However, as will be apparent as the description hereof proceeds, the coupling 10 is broadly applicable to coupling axial movement between limitedly independently translatable members.

More particularly, the coupling 10 comprises a first fitting 18 including an outer sleeve 20 and adjusting collar 22, and a second fitting 24 including a T-head shaft 26 and a bearing block 28.

The outer sleeve 20 includes a cylindrical lower body 30, an intermediate conical hub 32 and an upper cylindrical neck 34. A threaded bore 36 is formed in the neck 34 coaxial with axis 16 and terminates with an enlarged counterbore 38 coextensive with the body 30. A plurality of circumferentially spaced axially directed tapped holes are formed in the hub 32 and adjustably threadably receive set screws 39. The lower end of the body 30 is internally threaded for receiving the outer threaded end 40 of the adjusting collar 22. A counterbore 41 in the lower end of the collar 22 is adapted to telescopically receive the end of the shaft 14 under full spring deflection. The axial position of the adjusting collar 22 relative to the body 30 is fixedly established by means of a set screw 42, threadably received through a radially tapped hole in the lower portion of the body 30. The set screw 42 has an inner portion directly engaging the threaded end 40.

A Belleville spring assembly, generally indicated by the reference numeral 50, is operatively disposed between the lower surface 45 of the T-head shaft 26 and the upper surface 46 of the collar 22 to establish a yieldable lost motion connection.

The second fitting 24 is operatively disposed interior of the body 30 with the lower shank 44 of the T-head shaft 26 slidably extending through a central opening in the collar 22. The shaft 26 has a lower threaded end 54 adjustably received at a threaded hole connecting with the upper end of the shaft 14. The end 54 is fixedly axially adjustably retained on the shaft 14 by a set screw 56 radially extending through a tapped hole in the upper portion of the shaft 14 and engaging the threaded end 54. The T-head shaft 26 additionally includes an enlarged circular head 58 having the annular lower surface 45, an outer cylindrical surface 62 slightly smaller in diameter than the counterbore 38, and a spherical upper surface 64. A hardened annular wear ring 67 is retained in an annular groove formed in surface 46.

Figure 2:
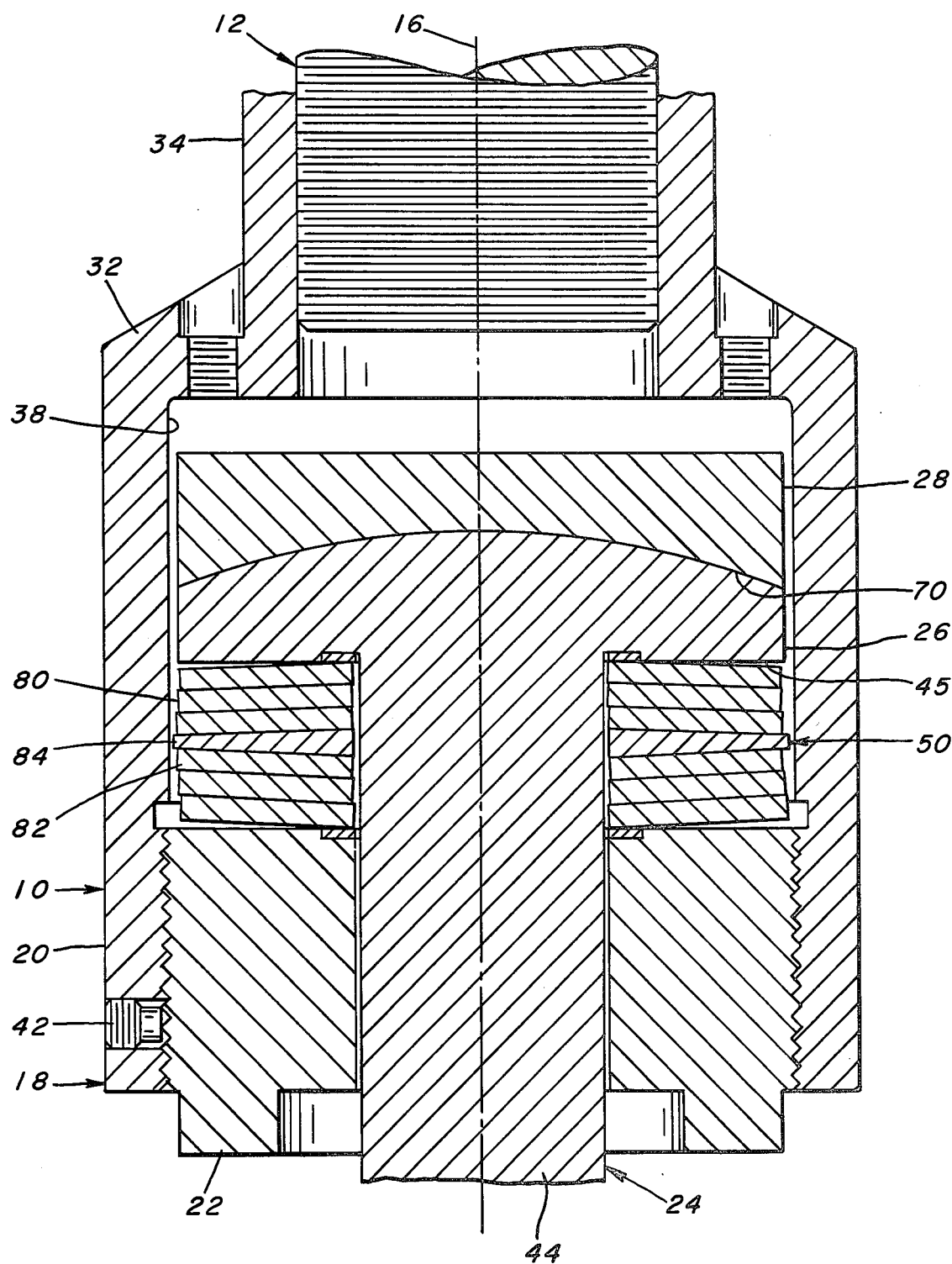
FIG. 2 is a view similar to FIG. 1 showing the coupling in the fully deflected position.

The bearing block 28 is loosely retained within the bore 38 and includes a concave spherical surface 70 mating with a convex spherical surface of the head 58, an outer cylindrical surface 72 slightly in smaller diameter than the counterbore 38, and an upper circular surface 74 adapted to engage as shown in FIG. 1 the annular transition surface 76 between the bore 36 and the counterbore 38. As shown in FIG. 2, with the surface 74 engaging the surface 76, which would be the case during compressive loading between the shafts 12 and 14, the lost motion connection is defined between the surface 45 and the surface 46. Absent the spring assembly 50, upon reversal of the loading, the shafts 12 and 14 would freely axially separate until such time as the lost motion connection was eliminated. Thereafter direct tensile loading would be applied between the shafts. However, with the aforementioned Belleville spring assembly 50, a gradually increasing tensile load is applied between the shafts 12, 14 as the latter axially separate reaching an upper limit when the Belleville springs 50 are fully deflected, after which a direct tensile coupling is provided.

More particularly, the Belleville spring assembly comprises an upper set of springs 80, a lower set of springs 82 and an intermediate spacer 84. The upper set of springs 80 comprises three annular frusto-conical washers of conventional design arranged in nesting relationship with the annular apex rim 85 of the outer upper spring engaging the wear ring 66 and the annular base rim of the lower inner spring engaging the upper outer periphery of the frusto-conical facing surface of the spacer 84. The lower set of springs 82 comprises three annular frusto-conical washers of conventional design arranged in nesting relationship with the annular apex rim 87 of the outer lower spring engaging the wear ring 67 and the base rim 88 of the upper inner spring engaging the outer lower periphery of the frusto-conical lower surface of the spacer 84.

The conical angle of the individual springs is less than the conical angle of the opposed surface of the spacer member so as to establish the desired load transmission characteristics within the deflecton limits by proper selection of angle, number of springs, spring dimension and materials in conjunction with the angle of the spacer member.

At the fully separated compressive loading mode between the shafts shown by dashed lines in FIG. 1, the spring assembly 50 is at its minimal deflection. This initial deflection may be preferably between zero and ten percent, however, any initial value may be selected. In the event it is desired to limit the loading between the members when the respective shafts 12 and 14 are at predetermined stop limits, the set screws 39 can be used to deflect the springs to some predetermined deflection corresponding to the desired loading. With the shank 44 fixed to the shaft 14 and the initial preloading set on the spring assembly by adjustment of screw 39, the first fitting 18 is rotated with respect to shaft 12 to increasingly thread the neck 34 thereonto, until the surface 74 disengages from the set screws 39 indicative that the initial preloading has been exceeded. Thereafter the set screws 39 may be removed from the assembly and the coupling has the limits thus established such that, at any time the members are at the respective stops that loading therebetween will not exceed the preloaded amount.

The coupling 10 above described is subjected to basically three types of loading as illustrated in FIGS. 1 and 2. In FIG. 1, the compressive loading mode is shown, in dashed lines wherein direct compressive forces are transmitted from shaft 12 to shaft 14. More particularly in this mode the surface 76 directly engages the upper surface 74 of bearing block 28 thereby directly transmitting compressive loads at the interface 70, 64 to the shaft 14. Therein, the spring assembly 50 is at its minimal deflection and the lost motion gap is at the upper limits of its spacing.

As a tensile load is initially applied between the members 12 and 14, the load is directly transmitted therebetween until the initial lower limit preload is exceeded at which level the spring sets 80 and 82 begin to deflect and the lost motion connection is decreased. During this increasing loading, the conical angle of the individual springs increases and at the deflection limit shown in FIG. 2 wherein the conical angle of the mating surfaces are identical, the springs are fully deflected at their predetermined maximum deflection and further deflection is affirmatively limited by the direct engagement of the lower surfaces with the mating surface of the spacer 84. Further loading increases will thereafter be transferred at the applied level.

The third mode is provided when the shafts 12 and 14 reach their individual stops thereby defining a predetermined spacing between the surfaces 74, 76 and 45, 46. This corresponds to the preloaded condition and provides a predetermined deflection of the springs and resultant predictable tensile loading on the stop surfaces.

It will thus be seen that the above coupling will provide controlled loading under certain conditions with direct coupling for conditions therebeyond. It should also be noted that whereas the subject invention is described with reference to a variable tensile loading, by relocation of the spring assembly the variable mode can be provided for compressive conditions. Further, the springs can be applied in a single set, a double set as disclosed or any further number deemed desirable with dependent or independent interrelationship with the spacer.

Accordingly, the invention hereinabove shown and described is capable of other forms readily apparent to those skilled in the art. Therefore, it is not intended to limit the scope of this invention by the above embodiment, but only by the claims which follow.

What is claimed is:
1. A coupling comprising:
 a pair of members drivingly interconnected for relative movement beyond spaced surfaces of a lost motion connection; frusto-conical spring means between said spaced surfaces having a first annular rim engaging one of the spaced surfaces and second annular rim engaging a frusto-conical spacer means operatively connected to the other of said spaced surfaces, the conical angle of the spring means being less than the conical angle of the spacer means such that the spring means increasingly de- flects toward the opposed surface of the spacer means upon relative movement therebetween until complete engagement therewith whereat further deflection is prevented and a direct driving connection established between the members.

2. A coupling comprising:

first and second members telescopically journalled for relative axial movement at an annular lost motion connection having axially spaced surfaces; first and second frusto-conical spring means disposed at said annular lost motion connection, said spring means being in opposed relation and separated by a spacer member, said spring means having inner annular apex rims engaging said axially spaced surfaces and having outer annular base rims initially engageable at low loads with the outer portion of the spacer member, the base surfaces of said spring means becoming fully engageable with the spacer member at a predetermined load.

3. The coupling recited in claim 1, wherein said spacer member has opposed frusto-conical surfaces, and the conical angle of the spacer member is greater than the conical angle of the spring means.

4. The coupling recited in claim 2 wherein the conical angle of the frusto-conical surfaces of the spacer member is greater than the conical angle of the spring means.

5. The coupling recited in claim 2 wherein one said spring means includes a plurality of nested Belleville springs.

6. The coupling recited in claim 2 wherein each of said first and second frusto-conical spring means consist of an identical number of Belleville springs disposed in nested relationship.

7. The coupling recited in claim 6 wherein the Belleville springs have identical deflection characteristics.

* * * * *